3,104,230
FOUNDRY SAND COMPOSITIONS CONTAINING POLYELECTROLYTES AND SALTS OF THE OXY ACIDS OF PHOSPHORUS AND SULFUR

John L. Dewey, Pleasant Hill, and Theo John West, Concord, Calif., assignors to The Dow Chemical Company, Midland, Mich., a corporation of Delaware
No Drawing. Filed Apr. 13, 1959, Ser. No. 805,723
7 Claims. (Cl. 260—29.6)

This invention relates to foundry mold and core sand compositions and a method for obtaining improved hot and dry strength properties of such compositions.

Conventional molding sands are prepared by adding to a classified sand, which may be of a washed, crude or reclaimed variety, a refractory clay such as bentonite or fire clay or a combination of both and a cirtically controlled amount of water. It is also common practice to employ an organic binder such as cereal, dextrines or wood flour. Deficiencies in the molding and working properties of the foregoing general type of compounds have presented a constant challenge to the foundry industry. A recent improvement is described in United States Patent 2,817,128, issued in December 24, 1957, which teaches the use of a water-soluble polyelectrolyte instead of conventional organic binders such as the aforementioned cereal, dextrine and wood flour. This advance improved the workability and flowability of the foundry sand and in addition the water content in such compositions was a less critical variable.

Although the aforementioned polyelectrolytes provided improvements over previously known binders with respect to some properties, other properties such as dry strength and hot strength, remained unimproved or were even degraded by the polyelectrolyte. Dry strength that is too low in the sand molds tends to produce a scabbing effect which appears in casts as a rough, slightly raised surface. Equally severe defects may be incurred as a result of dry strengths that are too high. Such defects are hot tears, cracks and expansion scabs.

One object of the present invention is to provide a foundry sand composition with proper dry strength properties. Another object of the invention is to provide a foundry sand composition with superior hot strength properties. A further object is to provide a means whereby dry and hot strength properties of foundry sand compositions can be maintained at desired levels. Other objects will be apparent from the following specification and claims.

These objects are obtained by incorporating into a foundry sand composition, comprising sand, clay, water and a water-soluble, polymeric, organic polyelectrolyte, an inorganic compound selected from phosphoric acids, the sodium, potassium, calcium and ammonium salts of the oxy-acids of phosphorus and the sodium, potassium, calcium and barium salts of the oxy-acids of sulfur. In such compositions containing a water-soluble polyelectrolyte and one or more of the inorganic compounds set forth above, dry and hot strength properties of the foundry sand composition are improved markedly while not materially affecting the other advantages gained through the addition of the polyelectrolyte.

In carrying out the invention the sand, clay, polymeric polyelectrolyte and inorganic compound as set forth above are mixed together in any suitable fashion with the addition of sufficient water to obtain the desired molding characteristics. In general, conventional mixing techniques and equipment such as sand mullers can be used. Good results have been obtained when employing from about 85 to 96 parts by weight of foundry sand, from 2 to 8 parts of clay, of which at least a major proportion is a western bentonite, from 1 to 5 parts of water, from 0.005 to 1 part of polymeric polyelectrolyte and from 0.005 to 1 part of said inorganic compound.

The inorganic compounds employed in accordance with the invention for obtaining improved strength properties include phosphoric acid and various alkali metal and alkaline earth metal salts of the oxy-acids of phosphorus and the oxy-acids of sulfur. Thus, for example, suitable inorganic compounds include the sodium, potassium and calcium pyrophosphates, the sodium, potassium and calcium metaphosphates, the mono-, di- or tribasic sodium, potassium and calcium ortho-phosphates and the sodium, potassium and calcium ortho-phosphites. Similarly, the mono- and di-basic ammonium hydrogen phosphates and the ammonium ortho-phosphites may be employed. Representative salts of the oxy-acids of sulfur, suitable for use in the invention, are the sodium, potassium, calcium and barium sulfates, the sodium, potassium, calcium and barium sulfites, the sodium and potassium bisulfates and sodium bisulfite.

As the water-soluble, polymeric, organic polyelectrolyte ingredient in the composition, any of the water-soluble polyelectrolytes described in U.S. Patent 2,817,128 may be employed. Such polyelectrolytes are water-soluble polymers and copolymers of organic compounds, having weight-average molecular weights of at least 10,000, having a substantially linear, continuous carbon chain derived by polymerization of aliphatic unsaturated groups and containing a plurality of water-solubilizing groups such as carboxyl and carboxamide groups. In a preferred embodiment of the invention, the water-soluble polyelectrolyte is a homopolymer of acrylamide or a copolymer derived from at least 75 mole percent of acrylamide with 25 mole percent or less of other suitable monomers, such polymer or copolymer having a weight-average molecular weight of at least 500,000.

The sand may be any of the standard foundry sands. It may be of the washed or shear variety or may be reclaimed sand. Where reclaimed sand is used, the beneficial effects of the invention may be diminished due to the presence of residual organic binders, such as cereal, dextrine or wood flour, previously used with the sand; however, if the polyelectrolyte and inorganic compound are added to each batch of reclaimed sand in accordance with the present invention, residual cereal and the like is progressively burned out so that the properties of the circulating reclaimed sand improve. Similarly, standard foundry refractory and bentonite clays are employed, provided that a major proportion of the total clay is of the western bentonite type.

A preferred embodiment of the invention is a composition which comprises from about 85 to 96 percent by weight of a standard foundry sand, from about 2 to 8 percent of western bentonite, from about 1 to 5 percent of water, from about 0.005 to 1 percent of one of the preferred homopolymers or copolymers of acrylamide described above and from 0.005 to 1 percent of sodium phosphate such as tetrasodium pyrophosphate.

The abbreviation, "A.F.S.," as herein employed refers to the American Foundrymen's Society and is used to designate standard test methods and specifications of said society. The term "flowability" as used in the following examples is defined as the property of the foundry sand mixture which determines whether the mixture will flow readily in conveyors and will fill pattern recesses and move in any direction against pattern surface under pressure. The reported figures are in percentage flowability as obtained from an A.F.S. standard flowability indicator attached to an A.F.S. standard sand rammer, the flowability reading being recorded between the fourth and fifth drops of the ramming hammer.

The term "green compressive strength" as used in the following examples is defined as the pressure in pounds per square inch required to cause collapse of a standard rammed cylinder of the undried sand composition. The term "permeability" as used herein is defined as the physical property which determines the ability of gasses to flow through molded masses of a foundry sand mixture. Permeability tests were made with a Harry W. Dietert Co. permmeter according to A.F.S. standard permeability procedure. The term "dry shear" as employed below is defined as the maximum shear stress which a foundry sand mixture is capable of withstanding without deformation and is expressed in pounds per square inch of cross-sectional area. Dry shear strength measurements were made on a Universal Sand Strength Machine with the dry shear strength heads in the upper position.

The following examples illustrate the invention but are not to be construed as limiting the same.

*Example 1*

A foundry molding sand composition was prepared by thoroughly mixing 9375 parts by weight of A.F.S. No. 705 mold grade sand, 225 parts by weight of western bentonite and 400 parts of water. A portion of this base composition had a flowability of 80 and a dry shear strength of 34.5 pounds per square inch. Further portions of the above base composition were mulled with a constant addition of water-soluble, polymeric, organic polyelectrolyte and varying amounts of tetrasodium pyrophosphate. The polyelectrolyte employed was a water-soluble polyacrylamide having a molecular weight of over 500,000 and having about 5 percent of its carboxamide groups hydrolysed to carboxyl groups. This polyacrylamide was added in the form of a finely ground powder. Portions of each of the resulting compositions were rammed in an A.F.S. standard sand rammer and the rammed specimens tested for flowability, permeability, green compressive strength and dry shear strength. The specimens for the dry shear tests were dried in an oven at 110° C. for 2 hours. The results are summarized in the following table wherein the amounts of polyacrylamide and of the phosphate are expressed in pounds per ton of base composition.

| Amount of— | | Flow-ability | Perme-ability | Green Compressive Strength | Dry Shear Strength |
| --- | --- | --- | --- | --- | --- |
| Polyacryl-amide | Tetrasodium Pyrophosphate | | | | |
| 1 | None | 88 | 59 | 6.8 | 25.5 |
| 1 | 1 | 87 | 58 | 6.7 | 32.5 |
| 1 | 2.5 | 87 | 58 | 6.7 | 38.0 |
| 1 | 5 | 86 | 57 | 6.6 | 50.0 |

It is apparent from these results that substantial increases may be obtained in dry strength properties (measured by dry shear strength) of the foundry sand composition and that it is possible through control of the proportions of the inorganic additive ($Na_4P_2O_7$ in this instance) to regulate the dry strength within relatively wide limits.

*Example 2*

A foundry sand mixture was prepared by thoroughly mulling a mixture containing 87.8 percent by weight of reclaimed foundry sand, 4.8 percent of western bentonite, 1.7 percent of wood flour and 4 percent water. To portions of this mixture were added a polyacrylamide similar to that of Example 1 and various inorganic compounds as set forth in the table below. The polymer and inorganic compound, if any, were each added in the amount of one pound per ton of finished composition. The comparative flowability, permeability, green compressive strength and dry shear properties of the resulting compositions were determined by A.F.S. standard methods.

| Additaments | Flow-ability | Perme-ability | Green Compressive Strength | Dry Shear Strength |
| --- | --- | --- | --- | --- |
| Polyacrylamide | 86 | 60 | 8.0 | 25.5 |
| Polyacrylamide+$Na_4P_2O_7$ | 85 | 58 | 8.2 | 38.0 |
| Polyacrylamide+$Na_2SO_4$ | 83 | 58 | 7.8 | 35.5 |
| Polyacrylamide+$Na_2SO_3$ | 84 | 59 | 8.1 | 33.5 |
| Polyacrylamide+$Na_4P_2O_6$ | 84 | 61 | 8.1 | 34.0 |
| Polyacrylamide+$Na_5P_4O_{13}$ | 84 | 60 | 8.2 | 36 |
| Polyacrylamide+$NaH_2PO_2$ | 83 | 58 | 7.9 | 32.5 |
| Polyacrylamide+$NaH_2PO_4$ | 84 | 59 | 7.6 | 33.0 |

*Example 3*

1900 pounds of reclaimed foundry facing sand, 17 pounds of wood flour, 17 pounds of fire clay and 48 pounds of western bentonite were mulled to molding consistency with sufficient water to provide 4 percent moisture in the finished base composition. Portions of this base composition were mulled with a finely powdered polyacrylamide, having a weight average molecular weight of over 1,000,000 and having about 6 percent of its carboxamide groups hydrolyzed to carboxyl groups, with and without various inorganic compounds as tabulated below. The polymer and inorganic compound, if any, were each added in the amount of one pound per ton of finished foundry sand composition except as indicated. Properties of the compositions were determined after 5 standard rams, as in the preceding examples, and are summarized in the following table.

| Additaments | Flow-ability | Perme-ability | Green Compressive Strength | Dry Shear Strength |
| --- | --- | --- | --- | --- |
| Polyacrylamide | 84 | 53 | 7.8 | 32 |
| Polyacrylamide+$Ca_3(PO_4)_2$ | 82 | 55 | 8.1 | 40 |
| Polyacrylamide+$K_3PO_4$ | 82 | 56 | 8.1 | 37 |
| Polyacrylamide+$K_2SO_4$ | 82 | 54 | 8.2 | 41 |
| Polyacrylamide+$K_2SO_3$ | 81 | 58 | 8.0 | 37 |
| Polyacrylamide+$(NH_4)_2HPO_4$ | 81 | 55 | 8.6 | 36 |
| Polyacrylamide+5 Pounds $Ca_3(PO_4)_2$ as Phosphate Rock | 82 | 55 | 8.7 | 38 |

*Example 4*

Two samples were obtained from a uniform mixture of foundry sand, bentonite and water. To one was added the conventional one percent cereal binder and to the other a mixture of 0.05 percent polyacrylamide and 0.05 percent $Na_4P_2O_7$. The hot strength properties of these samples are tabulated below.

| | Hot Compressive Strength | |
| --- | --- | --- |
| Temperature, °F. | Mixture+1 Percent Cereal, p.s.i. | Mixture+.05 percent $Na_4P_2O_7$+.05 percent Polyacrylamide, p.s.i. |
| 500 | 66 | 88 |
| 1,000 | 46 | 79 |
| 1,500 | 96 | 208 |
| 2,000 | 78 | 302 |
| 2,500 | 5 | 5 |

It will be noted that the hot strength in the middle temperature ranges for the composition of the present invention is two to over three times that obtained with the conventional cereal binder. On the other hand, at 2500° F. the hot strengths are comparable for both the novel composition and for that with the conventional binder. Ready collapsibility is thus obtained at the higher temperatures, enabling free shakeout and easy reprocessing of the sand.

*Example 5*

A foundry sand mixture was prepared containing 87.8 percent by weight of reclaimed sand, 4.8 percent of western bentonite, 1.7 percent of fire clay, 1.7 percent of wood flour, and 4 percent of water. To uniform portions of this mixture various polyelectrolytes were added, with and without tetrasodium pyrophosphate. The polyelectrolyte and pyrophosphate, if used, were each added in the amount of one pound per ton of finished sand composition. These compositions were thoroughly mulled and the properties thereof determined as in Example 1. The results are summarized in the following table.

| Additaments | Flowability | Permeability | Green Compressive Strength | Dry Shear Strength |
|---|---|---|---|---|
| 28 Percent Hydrolyzed Polyacrylamide | 87 | 54 | 6.5 | 30.5 |
| 28 Percent Hydrolyzed Polyacrylamide+Na$_4$P$_2$O$_7$ | 86 | 55 | 6.8 | 42 |
| Vinyl Acetatemaleic Anhydride Copolymer | 85 | 54 | 5.3 | 27.5 |
| Vinyl Acetatemaleic Anhydride Copolymer+Na$_4$P$_2$O$_7$ | 84 | 53 | 5.8 | 39 |

The hydrolysed polyacrylamide employed above was prepared by alkaline hydrolysis (18 percent of the carboxamide groups converted to sodium carboxylate groups) from a polyacrylamide having a molecular weight of over 1,000,000. The vinyl acetate-maleic anhydride copolymer was a commercial product prepared by copolymerizing equimolar proportions of vinyl acetate and maleic anhydride.

Compositions similar to that of Example 1 containing about one pound of polyacrylamide and about one pound of tetrasodium pyrophosphate per ton of finished molding sand have been extensively tested in steel foundry practice. Marked improvements in green sand properties, dry shear strength and hot strength were observed for the compositions as compared to sands containing conventional cereal and dextrine binders. Such improvements resulted in increased rate of mold production through reduction in requirements for hand riddling and ramming and through ease of mulling and transport of the new composition in the sand conveyor system. Other improvements were noted in the sharp and clean condition of castings prepared with this composition and in the ease of shakeout and sand recovery.

In such operations, it has been observed that the sand properties improve over a period of time as the new composition builds up in the recirculating system sand. Under such conditions of continuous operation with recycle, routine testing of sand properties serves as a guide in regulating the dosage of the polyelectrolyte and inorganic compound additaments. Thus, it is usually possible over a period of from one to three weeks in a foundry to reduce the incremental additions of polyelectrolyte and inorganic compound to one ounce or less of each per ton of reclaimed sand at the muller while maintaining the desired green, dry and hot strength properties.

We claim:
1. A composition which comprises foundry sand, clay and water and as essential additaments from about 0.005 to 1 percent by weight of a water-soluble, polymeric, organic polyelectrolyte and from about 0.005 to about 1 percent by weight of an inorganic compound selected from the group consisting of phosphoric acid, the sodium, potassium, ammonium and calcium salts of the oxy-acids of phosphorus and the sodium, potassium, calcium and barium salts of the oxy-acids of sulfur.
2. A composition, according to claim 1, wherein the polyelectrolyte is a polyacrylamide.
3. A composition, according to claim 2, wherein the polyacrylamide is characterized by a molecular weight of at least 500,000.
4. A composition, according to claim 1, wherein the inorganic compound is a sodium phosphate.
5. A composition, according to claim 4, wherein the sodium phosphate is tetrasodium pyrophosphate.
6. A composition which comprises from about 85 to about 96 percent by weight of foundry sand, from about 2 to about 8 percent by weight of clay of which at least a major proportion is a western bentonite, from about 1 to about 5 percent by weight of water, from about 0.005 to about 1 percent of a water-soluble, polymeric, organic polyelectrolyte and from about 0.005 to about 1 percent by weight of an inorganic compound selected from the group consisting of phosphoric acid, the sodium, potassium, ammonium and calcium salts of the oxy-acids of phosphorus and the sodium, potassium, calcium and barium salts of the oxy-acids of sulfur.
7. A composition, according to claim 6, wherein the polyelectrolyte is a polyacrylamide and the inorganic compound is a sodium phosphate.

References Cited in the file of this patent

UNITED STATES PATENTS

| 2,765,507 | Wolf et al. | Oct. 9, 1956 |
| 2,790,218 | Kohl et al. | Apr. 30, 1957 |
| 2,817,128 | Wickett | Dec. 24, 1957 |
| 2,895,838 | Ilenda | July 21, 1959 |
| 2,974,050 | Barlow | Mar. 7, 1961 |

FOREIGN PATENTS

| 871,824 | Germany | Mar. 26, 1953 |
| 497,301 | Canada | Oct. 27, 1953 |

OTHER REFERENCES

Johnstone: Minerals for the Chem. and Allied Indus., Wiley and Sons, New York, pp. 79–80.